E. M. LYON.
DIRIGIBLE HEADLIGHT FOR VEHICLES.
APPLICATION FILED OCT. 17, 1916.
1,225,984.
Patented May 15, 1917.
2 SHEETS—SHEET 2.
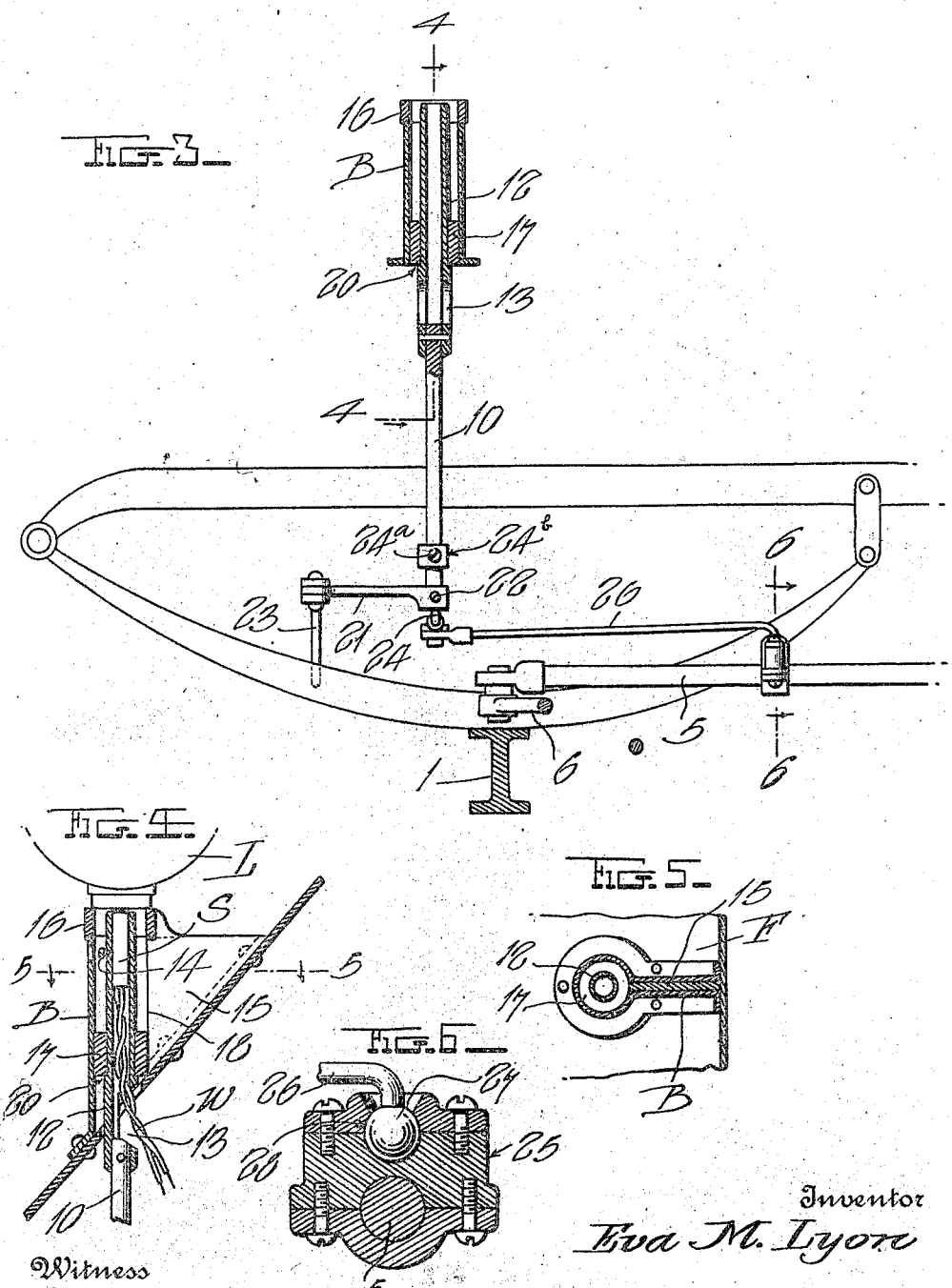

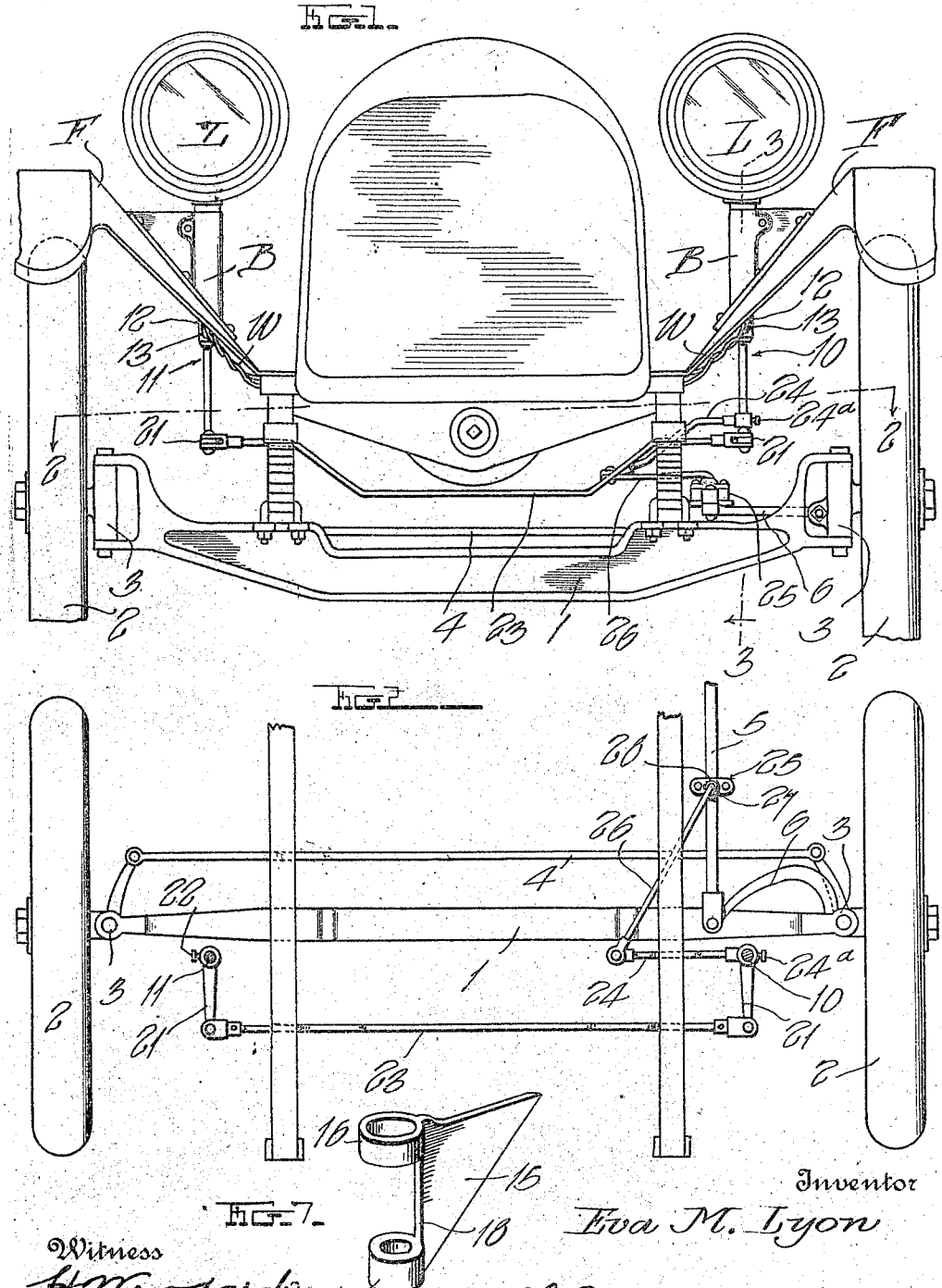

UNITED STATES PATENT OFFICE.

EVA M. LYON, OF ESCONDIDO, CALIFORNIA.

DIRIGIBLE HEADLIGHT FOR VEHICLES.

1,225,984.　　　　　Specification of Letters Patent.　　Patented May 15, 1917.

Application filed October 17, 1916. Serial No. 126,177.

*To all whom it may concern:*

Be it known that I, EVA M. LYON, a citizen of the United States, residing at Escondido, in the county of San Diego and State of California, have invented certain new and useful Improvements in Dirigible Headlights for Vehicles; and I do declare the following to be a full, clear, and exact description of the invention, such as will enable others skilled in the art to which it appertains to make and use the same.

This invention relates to improvements in dirigible headlights for motor and other vehicles.

The object of the invention is to provide a simple and efficient lamp operating mechanism by which the lamps may be simultaneously turned with the turning of the front or steering wheels of the vehicle so as to throw the light rays in the direction in which the vehicle is steered.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a front elevation of an automobile equipped with this improvement;

Fig. 2 is a horizontal section taken on the line 2—2 of Fig. 1;

Fig. 3 is a vertical section taken on the line 3—3 of Fig. 1;

Fig. 4 is a detail vertical section taken on the line 4—4 of Fig. 3;

Fig. 5 is a horizontal section taken on the line 5—5 of Fig. 4;

Fig. 6 is a detail vertical section taken on the line 6—6 of Fig. 3; and

Fig. 7 is a detail perspective view of the casting.

The lamp operating mechanism constituting this invention may be applied to various makes of automobiles, and in the embodiment illustrated a Dodge car is shown equipped therewith. In this embodiment the front portion of a Dodge car is shown, 1 representing the front axle upon the ends of which the steering wheels 2 are mounted in the usual manner. The knuckles 3 of the steering wheels are connected by a transverse rod 4 so that said wheels are simultaneously turned in the operation of the steering mechanism. This steering mechanism which is of any approved construction now in general use includes a steering rod 5 arranged longitudinally of the car and which is connected to the steering shaft actuated from the customary steering post. The other end of this rod 5 is pivotally connected to a steering arm 6 which is rigidly secured to one of the steering wheel knuckles. This arrangement of steering gear is quite common and constitutes no part of the present invention.

The lamp controlling and operating mechanism constituting the invention includes two lamp supports 10 and 11 which are exactly alike and hence one only will be described in detail. The support 10 is in the form of a post solid at its lower end and having a hollow upper portion 12 which is cut out at its lower end as shown at 13 for the passage of the circuit wires W which supply the current for the light, said wires entering the lamp at the rear of the reflector.

This post 10 receives the stem S of the lamp L and is secured thereto by a set screw 14 which is the screw usually employed in Dodge cars for holding the wire connection. This lamp post 10 is extended through a one-half inch hole formed in the fender F which is the only change necessary in the car for the application of this attachment.

A triangular casting 15 is carried by the tubular upper portion 12 of the post 10 and this casting conforms in shape to the lamp brackets B of Dodge cars which are formed of folded sheet metal and made triangular in shape and supported by the car fenders and between the walls of which this casting is mounted. Two collars 16 and 17 project laterally from the upright straight edge 18 of this casting. The upper collar 16 carries the lamp L which rests and turns thereon, the lower collar 17 fitting inside such bracket and engaged with a shoulder 20 formed on the tubular portion 12 of the post 10.

A laterally extending arm 21 is rigidly connected with the lower end of each post 10 and 11, being preferably secured by means of set screws 22. These arms 21 are connected by a rod 23 so that both lamp posts 10 and 11 will turn in unison when the vehicle is steered by actuating means now to be described.

Fixed to the lamp post 10 which is located on the driving side of the car, is a crank arm 24 which is the exact length of the steering arm 6 of the car so that the lamp will be turned exactly the same distance that the steering wheels are turned.

A socket member 25 is clamped to the steering rod 5 of the car and a link 26 connects this member with the free end of the crank arm 24. This link 26 has a ball 27 at the end engaged with the socket member which fits in the socket 28 of said member, forming a ball and socket connection between the steering rod and the crank arm 24. The crank arm 24 is generally fixed to the post 10 by a set screw 24$^a$ passing through a collar 24$^b$ carried by said arm and encircling said post, although obviously it may be secured in any other suitable manner.

When the parts are connected as above described, it will be obvious that the turning of the steering wheel which imparts a reciprocatory motion to the steering rod 5 will operate to turn the front wheels of the car through the steering arm 6 and simultaneously to turn the lamp posts 10 and 11 through the mechanism above described, thereby causing the lamps to throw their light directly in the path of the car in whatever direction it may be steered.

The operating mechanism above described is so mounted on the car as to be entirely out of sight and the whole attachment when used in connection with two lamps constitutes a few parts only, rendering the device cheap to manufacture and easily retained in working order.

While the principle of operation of the invention together with the device which is now considered to be the best embodiment thereof, is herein described, it is desired to have it understood that the device shown is merely illustrative and that such changes may be made as are within the scope of the claimed invention.

I claim:

1. The combination with a vehicle steering mechanism; of a lamp supporting bracket secured upon the vehicle frame, a lamp carrying casting mounted in said bracket and having vertically alined laterally extending collars, a lamp post loosely mounted in said collars and having a tubular upper end, a lamp having a stem fixed to said tubular post end, said lamp resting and turning on the uppermost of said collars, and a connection between said post and steering mechanism whereby said lamp post is turned in said collars when the steering mechanism is operated.

2. The combination with a vehicle steering mechanism; of triangular lamp supporting brackets composed of folded sheet metal, triangular lamp carrying castings mounted in said brackets and having vertically spaced alined collars, lamp posts having tubular upper ends loosely mounted in said collars and with openings formed therein, lamps each having a stem fixed to one of said tubular post ends, said lamps resting and turning on the uppermost of said collars, a connection between said posts for synchronously turning them, and a connection between one of said posts and said steering mechanism whereby the posts are turned in said collars when the steering mechanism is operated.

In testimony whereof I have hereunto set may hand in the presence of two subscribing witnesses.

EVA M. LYON.

Witnesses:
O. R. MAYNARD,
L. N. TURRENTINE.